US007315232B2

(12) United States Patent
Koike

(10) Patent No.: US 7,315,232 B2
(45) Date of Patent: Jan. 1, 2008

(54) USE MANAGEMENT METHOD AND PROCESSING APPARATUS

(75) Inventor: Junichi Koike, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 11/255,640

(22) Filed: Oct. 20, 2005

(65) Prior Publication Data

US 2006/0087424 A1 Apr. 27, 2006

(30) Foreign Application Priority Data

Oct. 25, 2004 (JP) ............................ 2004-309867

(51) Int. Cl.
*G05B 19/00* (2006.01)

(52) U.S. Cl. .................... 340/5.52; 340/5.2; 340/5.21; 340/5.53; 358/1.14; 713/186

(58) Field of Classification Search .............. 340/5.52, 340/5.1, 5.2, 5.21, 5.53, 5.54, 539.1; 358/1.14, 358/1.15, 1.16, 514; 382/116; 235/40, 43; 713/182, 186
See application file for complete search history.

(56) References Cited

U.S. PATENT DOCUMENTS 6,819,219 B1 * 11/2004 Bolle et al. ................ 340/5.52
6,885,439 B2 * 4/2005 Fujieda ........................ 356/71

FOREIGN PATENT DOCUMENTS

| | | |
|---|---|---|
| JP | 2001-255795 | 9/2001 |
| JP | 2002-099515 | 4/2002 |
| JP | 2004-061652 | 2/2004 |
| JP | 2005-115633 | 4/2005 |

* cited by examiner

*Primary Examiner*—Davetta W. Goins
(74) *Attorney, Agent, or Firm*—Peter J. Manus; David G. Conlin; Edwards Angell Palmer & Dodge LLP

(57) ABSTRACT

In an image processing apparatus is arranged for authenticating through collating an input of identification code with an identification code stored in advance, reading the biometrics information from an entry process made when the authentication has been admitted and storing the biometrics information in the first storage area of a storage unit, collating biometrics information read from the succeeding entry process with the biometrics information stored in the first storage area, conducting a process based on the entry process with the authenticated identification code when the collation result is conformity, and erasing the biometrics information stored in the first storage area when the collation result is disconformity, when an entry process is made with biometrics information which is different from the biometrics information stored in the first storage area, the biometrics information stored in the first storage area before erased is evacuated to the second storage area.

15 Claims, 8 Drawing Sheets

USE MANAGEMENT METHOD AND PROCESSING APPARATUS

CROSS-REFERENCE TO RELATED APPLICATIONS

This nonprovisional application claims priority under 35 U.S.C. § 119(a) on Patent Application No. 2004-309867 filed in Japan on Oct. 25, 2004, the entire contents of which are hereby incorporated by reference.

BACKGROUND OF THE INVENTION

1. Field of the Invention

The present invention relates to a processing apparatus and a use management method for authenticating through collating an input of identification code with an identification code stored in advance, reading biometrics information from an entry process made when the authentication has been admitted and storing the biometrics information in a first storage area of a storage unit, collating biometrics information read from the succeeding entry process with the biometrics information stored in the first storage area, conducting a process based on the entry process with the authenticated identification code when the collation result is conformity, and erasing the biometrics information stored in the first storage area of the storage unit when the collation result is disconformity.

2. Description of the Related Art

An image processing apparatus (a processing apparatus) such as a copy machine or a composite office machine is known for authenticating through accepting an identification code such as a department code thus to manage the use of the apparatus with respect to users, use states etc. For example, an image processing apparatus comprises a function of permitting or inhibiting the copying process by collating an input of department code at the entry process in use with a department code which has been registered in advance and a function of recording the number of copies for each department or the like.

Another image processing apparatus is proposed where the fingerprint of a user is read and collated with its fingerprint registered in advance for authentication and thus determining either permission or inhibition of the use of the apparatus (see, for example, Japanese Patent Application Laid-Open No. 2001-255795). Since the anther image processing apparatus is capable of collating the department code through accepting the fingerprint, its operability can be improved in use.

The permission of use determined by the identification code such as a department code is not canceled before the stop button is turned on by the user who has entered the department code or a predetermined time has elapsed after the permission. This will produce a drawback that, once the permission of use has been granted to the user who entered the department code, it can be used by another user who enters no department code.

For solving the drawback, we, the applicants, have proposed a method of detecting the change of one user to another from the biometrics information such as fingerprints thus to prevent any unauthenticated use by using the department code of an authenticated user. However, the method is unfavorable when any other user than the authenticated user (an original user) uses the apparatus temporarily by conducting an interrupt process or an operation assist process, because it requires the re-authentication of the original user with the department code as well as the storage of its biometrics information when the temporal use by the other user has been completed.

BRIEF SUMMARY OF THE INVENTION

The present invention has been made with the aim of solving the above problem and it is an object of the present invention to provide a use management method and a processing apparatus for evacuating the biometrics information stored in the first storage area before erased to the second storage area of the storage unit when an entry process is made with biometrics information which is different from the biometrics information stored in the first storage area of a storage unit, and restoring the biometrics information in the second storage area to the first storage area of the storage unit when an entry process is made with the biometrics information having been evacuated, thus improving the convenience of a user.

It is another object of the present invention to provide a processing apparatus arranged for evacuating the biometrics information stored in the first storage area of a storage unit before erased to the second storage area of the storage unit while storing the authenticated identification code in the storage unit when an interrupt instruction is accepted, thus improving the convenience of a user.

It is a further object of the present invention to provide a processing apparatus arranged for evacuating the biometrics information stored in the first storage area of a storage unit before erased to the second storage area of the storage unit when an operation assist instruction is accepted, thus improving the convenience of a user.

It is a still further object of the present invention to provide a processing apparatus arranged for restoring the biometrics information in the second storage area to the first storage area of the storage unit when the end of an entry process with biometrics information which is different from the biometrics information evacuated to the second storage area of a storage unit is accepted, thus improving the convenience of a user.

It is a still further object of the present invention to provide a processing apparatus arranged for restoring the biometrics information in the second storage area of the storage unit to the first storage area of the storage unit when the process according to an entry process with biometrics information which is different from the biometrics information evacuated to the second storage area of a storage unit has been ended, thus improving the convenience of a user.

It is a still further object of the present invention to provide a processing apparatus equipped with receiving means, thus processing data received from the outside.

It is a still further object of the present invention to provide a processing apparatus equipped with image forming means for forming an image on a sheet of material, thus conducting its image forming process.

A use management method for a processing apparatus according to the present invention is a use management method for a processing apparatus, said processing apparatus arranged for authenticating through collating an input of identification code with an identification code stored in advance, reading biometrics information from an entry process made when the authentication has been admitted and storing the biometrics information in a first storage area of a storage unit, collating biometrics information read from the succeeding entry process with the biometrics information stored in the first storage area, conducting a process based on the entry process with the authenticated identification code when the collation result is conformity, and erasing the biometrics information stored in the first storage area of the storage unit when the collation result is disconformity, the method comprising the steps of evacuating the biometrics information stored in the first storage area before erased to the second storage area of the storage unit when an entry process is made with biometrics information which is different from the biometrics information stored in the first storage area of the storage unit; and restoring the biometrics information in the second storage area to the first storage area of the storage unit when an entry process is made with the biometrics information having been evacuated.

A processing apparatus according to the present invention is a processing apparatus comprising: means for authenticating through collating an input of identification code with an identification code stored in advance; means for reading biometrics information from an entry process made when the authentication has been admitted and storing the biometrics information in a first storage area of a storage unit; means for collating biometrics information read from the succeeding entry process with the biometrics information stored in the first storage area; means for conducting a process based on the entry process with the authenticated identification code when the collation result is conformity; means for erasing the biometrics information stored in the first storage area of the storage unit when the collation result is disconformity; evacuating means for evacuating the biometrics information stored in the first storage area before erased to the second storage area of the storage unit when an entry process is made with biometrics information which is different from the biometrics information stored in the first storage area of the storage unit; and restoring means for restoring the biometrics information in the second storage area to the first storage area of the storage unit when an entry process is made with the biometrics information having been evacuated by the evacuating means.

The processing apparatus according to the present invention is characterized by further comprising: interrupt accepting means for accepting an interrupt instruction for instructing a process based on an entry process with biometrics information, which is different from the biometrics information stored in the first storage area of the storage unit, and an identification code newly authenticated, wherein the evacuating means evacuates the biometrics information stored in the first storage area of the storage unit before erased to the second storage area of the storage unit and stores the authenticated identification code in the storage unit when the interrupt instruction is accepted by the interrupt accepting means.

The processing apparatus according to the present invention is characterized by further comprising: operation assist accepting means for accepting an operation assist instruction for instructing a process based on an entry process with biometrics information, which is different from the biometrics information stored in the first storage area of the storage unit, and the authenticated identification code, wherein the evacuating means evacuates the biometrics information stored in the first storage area of the storage unit before erased to the second storage area of the storage unit when the operation assist instruction is accepted by the operation assist accepting means.

The processing apparatus according to the present invention is characterized by further comprising: end accepting means for accepting the end of an entry process with biometrics information which is different from the biometrics information evacuated to the second storage area of the storage unit, wherein the restoring means restores the biometrics information in the second storage area to the first storage area of the storage unit when the end of the entry process is accepted by the end accepting means.

The processing apparatus according to the present invention is characterized in that the restoring means restores the biometrics information in the second storage area of the storage unit to the first storage area of the storage unit when the process according to the entry process with biometrics information which is different from the biometrics information evacuated to the second storage area of the storage unit has been ended.

The processing apparatus according to the present invention is characterized by further comprising: receiving means for receiving data, wherein the data received by the receiving means is processed.

The processing apparatus according to the present invention is characterized by further comprising: image forming means for forming an image on a sheet of material, wherein the process of forming an image is conducted.

In the present invention, the biometrics information stored in the first storage area of the storage unit before erased is evacuated to the second storage area of the storage unit when an entry process is made with biometrics information which is different from the biometrics information stored in the first storage area of the storage unit. Then, the biometrics information which is different from the biometrics information which has been evacuated is stored in the first storage area of the storage unit for use in the collation at an entry process. When an entry process is made with the biometrics information evacuated to the second storage area of the storage unit, the biometrics information stored in the second storage area is restored to the first storage area of the storage unit and used for collation at an entry process. For example, when the process of a user A is changed to the process by a user B temporarily, the biometrics information of the user A is evacuated. Then, as the process is changed from the user B to the user A again, the biometrics information of the user A is restored. Since the evacuation and restoring of the biometrics information of an original user (the user A) is carried out automatically, no re-storing of the biometrics information of the authenticated original user will be needed thus improving the convenience of a user.

In the present invention, the biometrics information stored in the first storage area of the storage unit before erased is evacuated to the second storage area of the storage unit by the evacuating means when an interrupt instruction is accepted by the interrupt accepting means while the authenticated identification code is stored in the storage unit. For example, when the process of a user A is temporarily changed to the process by a user B switching the interrupt key on, the biometrics information of the user A is evacuated together with the authenticated identification code. This is followed by authenticating the identification code of the user B and storing the biometrics information of the user B in the first storage area of the storage unit. Then, as the process is changed from the user B to the user A again, the biometrics information of the user A is restored to the first storage area to validate the authenticated identification code of the user A. Since the evacuation and restoring of the biometrics information of an original user (the user A) with its identification code is carried out automatically, no re-storing of the biometrics information and no re-authenticating of the identification code of the original user will be needed thus improving the convenience of a user.

In the present invention, the biometrics information stored in the first storage area of the storage unit before erased is evacuated to the second storage area of the storage unit by the evacuating means when an operation assist instruction is accepted by the operation assist accepting means. Meanwhile, the identification code which has been authenticated is used. For example, when the process of a user A who is unskilled is temporarily assisted by a user B switching the operation assist key on, the biometrics information of the user A is evacuated. This is followed by storing the biometrics information of the user B in the first storage area of the storage unit. The identification code assigned to the user A is used. Then, as the assist process by the user B has been completed, the biometrics information of the user A is restored for continuing the process of the user A. Since the evacuation and restoring of the biometrics information of an original user (the user A) is carried out automatically, no re-storing of the biometrics information of the original user will be needed thus improving the convenience of a user. Also, the assist process of an assistant (the user B) can be conducted without authenticating the identification code of the assistant but with the identification code of the original user (the user A). For example, the number of copies managed for each department is precisely counted by the identification code of the original user (the user A) but not of the assistant (the user B).

In the present invention, the biometrics information evacuated to the second storage area of the storage unit is restored to the first storage area by the restoring means when the end of an entry process with biometrics information which is different from the biometrics information evacuated to the second storage area is accepted by the end accepting means. The end of the entry process may be determined by the switching on of the interrupt key, the operation assist key, an interrupt end key, or an operation assist end key. This will permit the user who runs an interrupt process or an operation assist process to conduct some other steps before the end of the process is instructed.

In the present invention, the biometrics information evacuated to the second storage area of the storage unit is restored to the first storage area of the storage unit by the restoring means when an entry process with biometrics information which is different from the biometrics information evacuated to the second storage area of the storage unit is completed. Since the restoring of the evacuated biometrics information of an original user is carried out automatically after the end of a process according to the entry process, the user who runs an interrupt process or an assist process needs not to instruct the end of the process.

In the present invention, the data received by the receiving means is processed. For example, for the confidential copying process, print data accompanied with its identification code is transferred from a computer to the processing apparatus where it is printed through accepting the identification code. The printing process of data transferred from a computer to the processing apparatus by any other user, can be made by the interrupt instruction.

In the present invention, the image forming means for forming an image on a sheet of material is comprised, thus conducting the image forming process.

According to the present invention, the re-storing of the biometrics information of an original user authenticated in advance is eliminated, thus improving the convenience of a user.

According to the present invention, the re-storing of the biometrics information and the re-authentication of the identification code of an original user authenticated in advance is eliminated, thus improving the convenience of a user.

According to the present invention, the re-storing of the biometrics information of an original user authenticated in advance is eliminated, thus improving the convenience of a user. Moreover, the identification code assigned to the original user is utilized for carrying out an operation assist process.

According to the present invention, the user who runs an interrupt process or an assist process can conduct some other steps before the end of the process is instructed, thus improving the convenience.

According to the present invention, the user who runs an interrupt process or an assist process need not instruct the end of the process, thus improving the convenience.

According to the present invention, any data received from the outside can be processed.

According to the present invention, an image forming process can be conducted.

The above and further objects and features of the present invention will more fully be apparent from the following detailed description with accompanying drawings.

DETAILED DESCRIPTION OF THE INVENTION

The following describes embodiments of the present invention in detail referring to the relevant drawings. Although the processing apparatus in the following description is an image processing apparatus having a copying (duplicating) function and a printing function, the image processing apparatus (processing apparatus) of the present invention may be any applicable apparatus such as a facsimile machine or a composite office machine having a copying function and a facsimile function etc.

Figure 1:
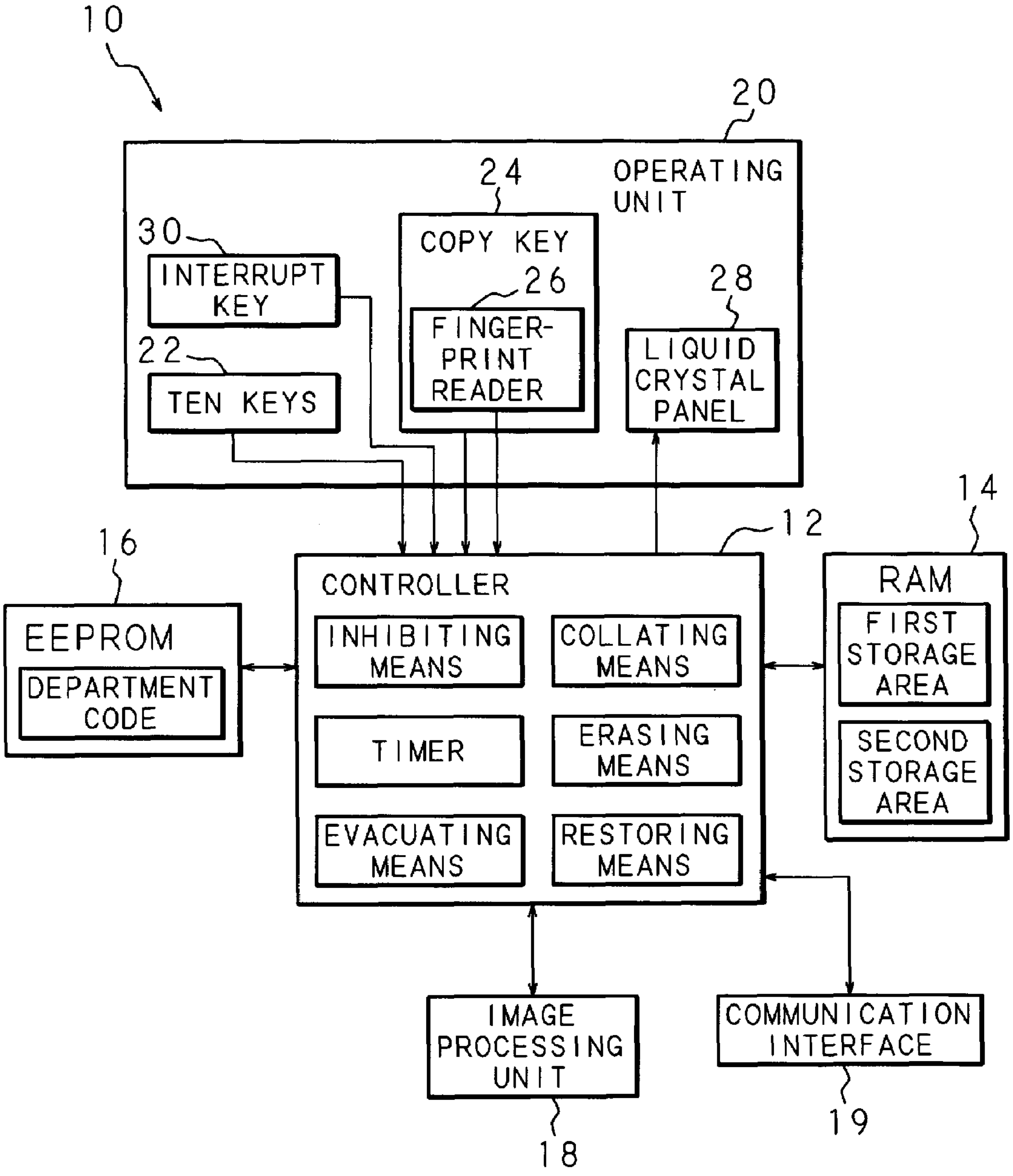
FIG. 1 is a block diagram of an image processing apparatus according to the present invention.

FIG. 1 is a block diagram showing an example of an image processing apparatus 10 according to the present invention. The image processing apparatus 10 includes an image processing unit (image forming means) 18 for conducting an image forming process such as copying an image on a sheet of material, an operating unit 20 for accepting an entry process and displaying an operation state, a random access memory (RAM) 14 for storing data temporarily, a (nonvolatile) electrically erasable programmable read only memory (EEPROM) 16 that holds data, and a controller 12 connected with the aforementioned components 14, 16, 18, and 20 and capable of controlling each component or the like.

FIGS. 2A, 2B, 3A, 3B, 4A, and 4B illustrate processes of the operating unit 20. The operating unit 20 includes ten keys 22 for accepting the entry of numerals and symbols etc, a copy key 24 for accepting an instruction for the copying process, an interrupt key (interrupt accepting means) 30 for accepting an interrupt instruction for a temporary process during the copying or the like, and a liquid crystal panel 28 for displaying such as the current process and the current entry status or the like. Entry data entered via the ten keys 22, the copy key 24, or the interrupt key 30 is transferred to the controller 12. Display data for the liquid crystal panel 28 is transferred from the controller 12. The display data may be store in the EEPROM 16. Also, control programs and default settings for use with the controller 12 for controlling the process of each component in the image processing apparatus 10 are stored in the EEPROM 16.

The controller 12 authenticates through collating an input of department code (identification code) accepted from the operating unit 20 with the department code stored in the EEPROM 16 and when the authentication is admitted, controls the image processing unit 18 to conduct its image processing in response to the entry process accepted by the operating unit 20. For example, upon accepting the number of copies from the ten keys 22 and an instruction for staring the copying process from the copy key 24 after the authentication, the controller 12 controls the image processing unit 18 to read an original and print down the specified number of copies from the original.

In this embodiment, the copy key 24 is equipped with a fingerprint reader 26 for reading fingerprint data (biometrics information) through a charge coupled device (CCD), for example. The fingerprint reader 26 is provided for reading fingerprint data when a finger of the user is placed directly on a fingerprint readout area on the front of the copy key 24 and transferring the read fingerprint data to the controller 12. As the fingerprint reader 26, any known fingerprint reading means introduced for authentication of a personal may be used.

The fingerprint data read by the fingerprint reader 26 at the entry process when the authentication has been admitted through the department code is then stored in a first storage area of the RAM (storing unit) 14 by the controller 12. For example, when the copy key 24 is pressed by the user when the authentication has been admitted through the department code, the controller 12 receives the fingerprint data read by the fingerprint reader 26 from the operating unit 20 and stores the received fingerprint data in the first storage area of the RAM 14.

Also, the controller 12 acts as collating means for collating an input of fingerprint data read from the fingerprint reader 26 with the fingerprint data stored in the first storage area of the RAM 14 when the fingerprint data has been stored in the first storage area of the RAM 14. For example, upon the copy key 24 being pressed again by the user after the authentication has been admitted through the department code, the controller 12 collates the fingerprint data of the user read from the fingerprint reader 26 with the fingerprint data stored in the first storage area of the RAM 14.

When the user is the same and the collated fingerprint data are identical, the collation result is "conformity". If another user is present and the fingerprint data are not identical, the collation result is "disconformity". The controller 12 hence detects from "disconformity" of the collation result that the current user is different from the preceding user. The fingerprint data collation may be implemented by any known fingerprint data collating method that has been introduced for authentication of individuals.

The controller 12 acts as inhibiting means for inhibiting image processing according to the entry process when the collation result is "disconformity" (indicating that the user is different, except for an interrupt process which will be explained later). More specifically, when the collation result is "disconformity", the controller 12 controls so as to have the image processing unit 18 cancel the copying process in response to the entry process. In addition, when the collation result is "disconformity", the controller 12 authenticates using an identification code accepted from the operating unit 20. When the authentication has been admitted, the controller 12 controls so as to have the image processing unit 18 start the copying process in response to the entry process. The controller 12 acts as erasing means for erasing the fingerprint data stored in the first storage area of the RAM 14 when the collation result is "disconformity". Further, the controller 12 includes a timer, and acts as erasing means for erasing the fingerprint data stored in the RAM 14 when no further entry process is accepted within a predetermined time after accepting an entry process.

The controller 12 further acts as evacuating means for evacuating the department code (identification code) and the fingerprint data (biometrics information), which are a permission of use authenticated of the original user, from the first storage area to a second storage area of the RAM 14 when another user, who is different from the user (original user) authenticated with the department code, press the interrupt key (interrupt accepting means) 30 to interrupt the current process for conducting its desired process temporarily. Upon accepting the interruption instruction, the controller 12 conducts the process of authenticating the another user, who uses temporarily through the interrupt, from the department code, similar to that for the original user. When the authentication has been admitted, the controller 12 stores the fingerprint data of the another user in the first storage area of the RAM 14, and carries out the image processing according to the entry process through collating an input of fingerprint data accepted by the operating unit 20 with the stored fingerprint data.

When the interrupt key (end accepting means) 30 is pressed again to cancel the interrupt process or the interrupt process by the another user for copying has been completed one job cycle, the controller 12 makes the department code for the original user valid and acts as restoring means for restoring the fingerprint data in the second storage area to the first storage area of the RAM 14.

Figure 2A:
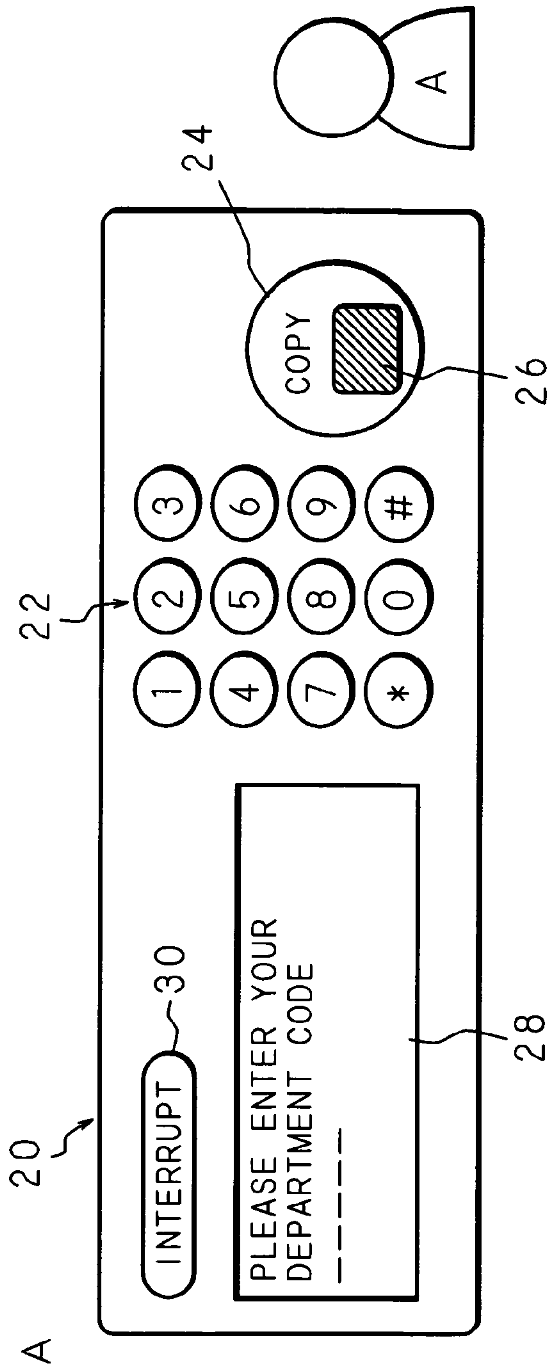
FIGS. 2A and 2B are diagrams showing examples of an operating unit of the image processing apparatus.
Figure 5:
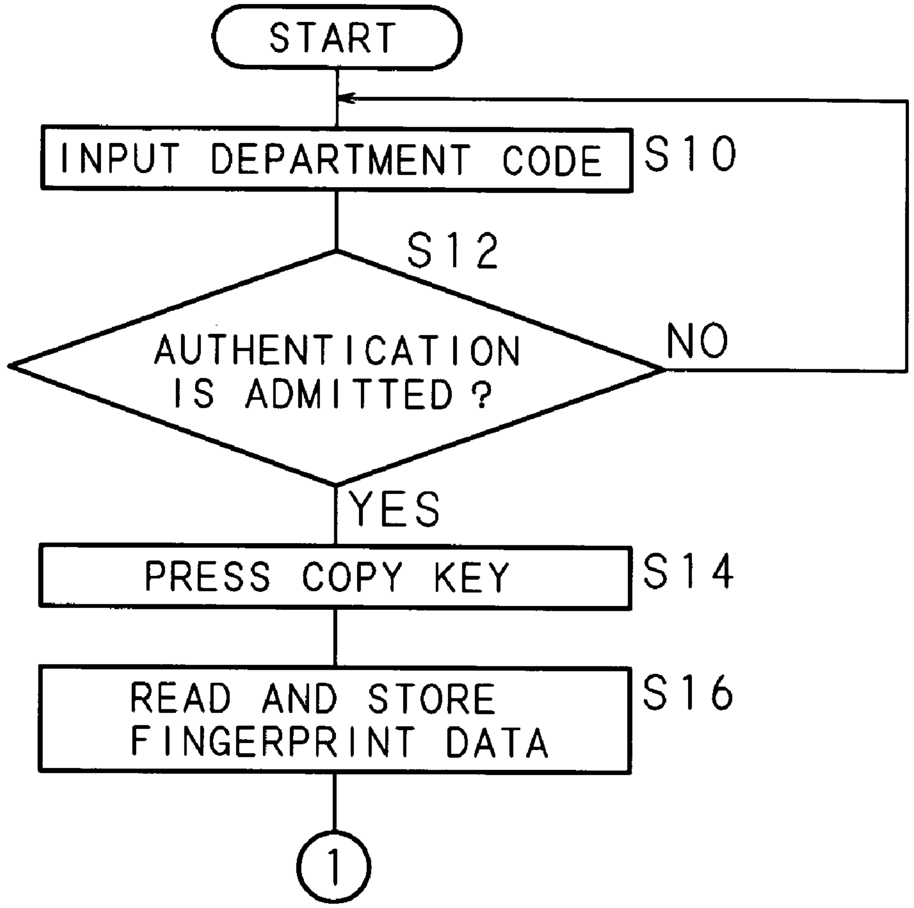
FIG. 5 is a flowchart showing procedures of the copying process by a user.
Figure 6:
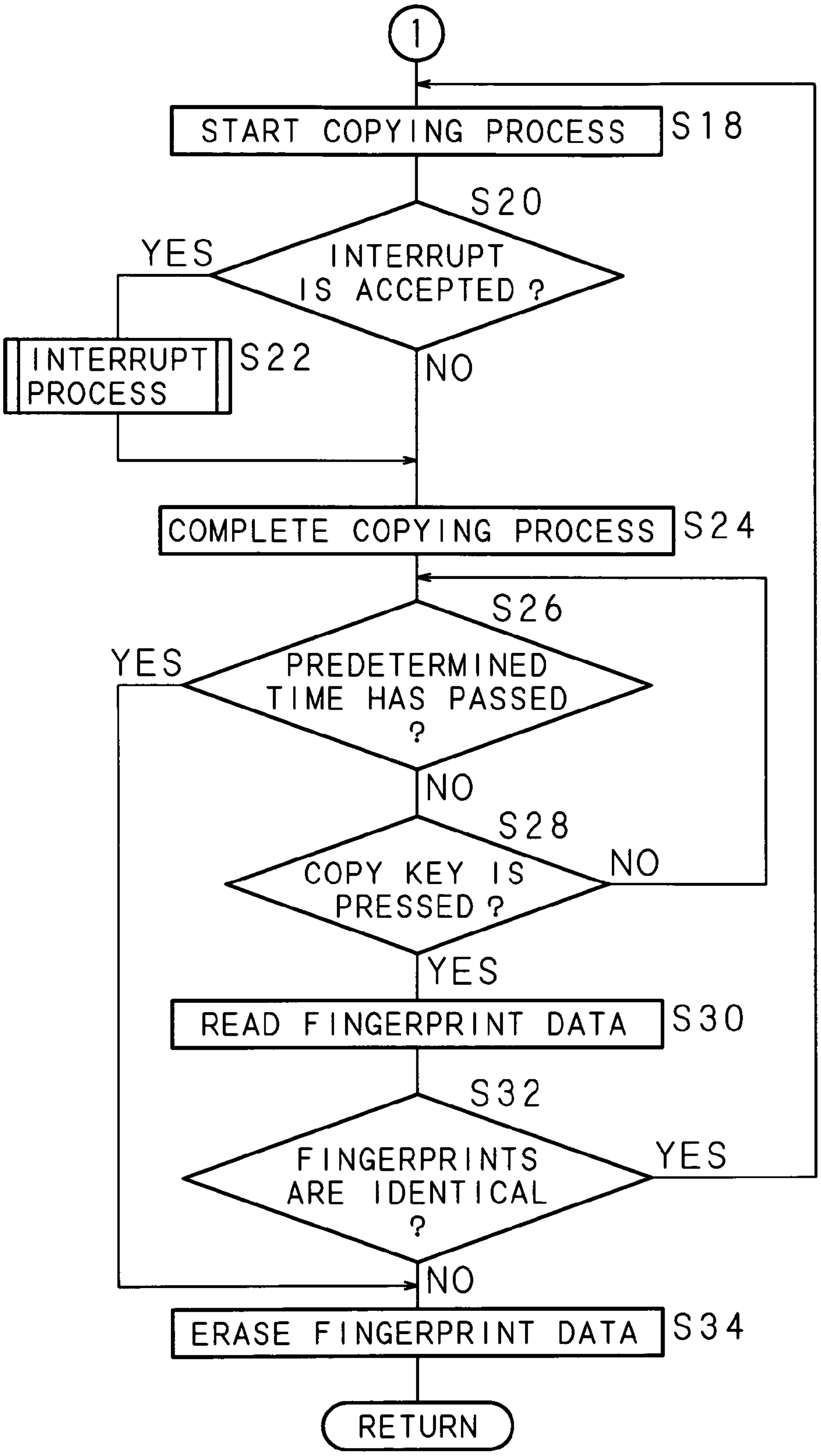
FIG. 6 is a flowchart showing procedures of the copying process by the user.

FIGS. 5 and 6 are flowcharts showing procedures of the copying process. The procedures start with the controller 12 accepting an input of department code from the operating unit 20 (S10) and collating the department code with the department code stored in the EEPROM 16 to authenticate the user. For example, the controller 12 controls the liquid crystal panel 28 to display a message "Please input your department code" as shown in FIG. 2A, and accepts an input of the department code from the ten keys 22. When the authentication is not admitted ("no" at S12), the entry of the department code is repeated (S10).

Figure 2B:
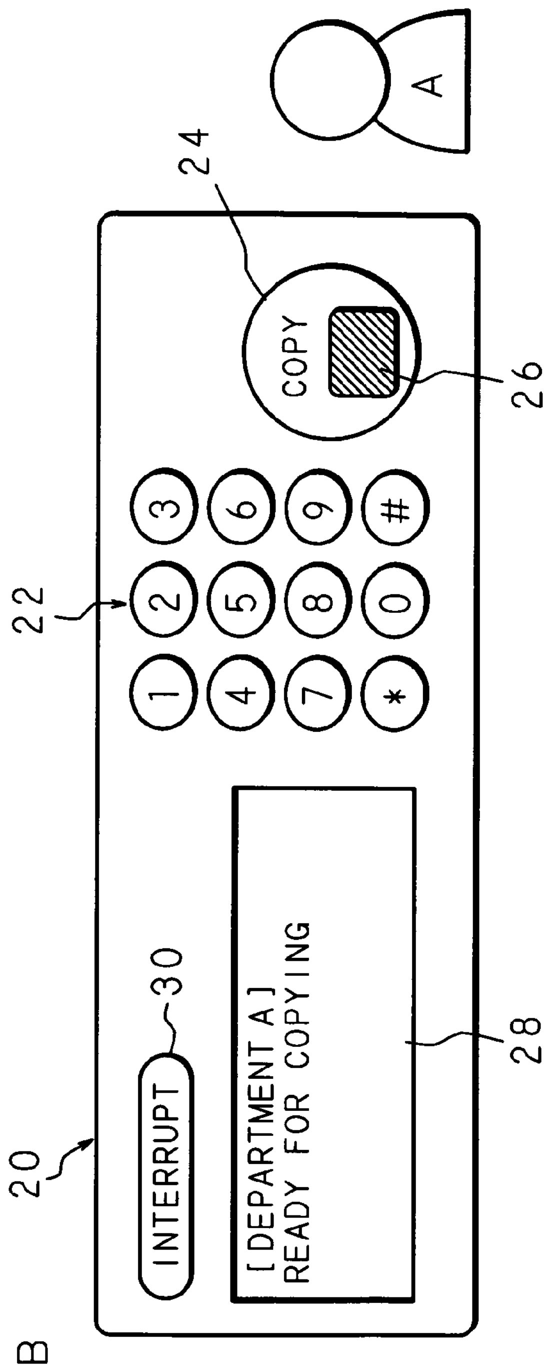

When the authentication is admitted ("yes" at S12), the controller 12 controls the liquid crystal panel 28 to display a message "Ready for Copying" together with the "department A" authenticated by the department code, as shown in FIG. 2B. In FIGS. 2A and 2B, the authentication has been admitted after the entry of the identification code of the department A by the user A. When the user A presses down the copy key 24 (S14), the fingerprint reader 26 starts reading the fingerprint data of the user A. The read fingerprint data is then transferred together with the start signal from the copy key 24 to the controller 12. In turn, the controller 12 stores the fingerprint data in the first storage area of the RAM 14 (S16). At the same time, the controller 12 controls the image processing unit 18 to start the copying process as the copy key 24 has been pressed down (S18).

Figure 3A:
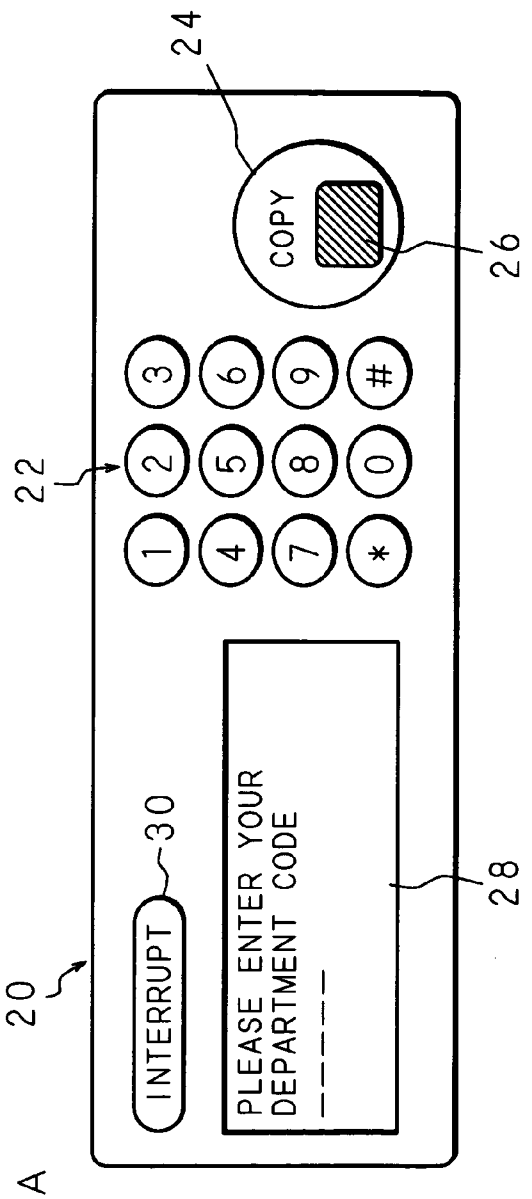
FIGS. 3A and 3B are diagrams showing examples of the operating unit.

When an interrupt instruction is accepted with the interrupt key 30 pressed during the copying process ("yes" at S20), the controller 12 conducts an interrupt process (S22). When no interrupt instruction is accepted ("no" at S20) or the interrupt process is ended (S22), the copying process is continued. When the copying process has been completed (S24), the controller 12 erases the fingerprint data stored in the first storage area of the RAM 14 (S34) provided that the copy key 24 is not pressed again ("no" at S26 or "no" at S28) and a predetermined time has elapsed ("yes" at S26). For example, when the image processing apparatus 10 is not operated by the user A and remains idle for the predetermined time and more, the fingerprint data of the user A stored in the first storage area of the RAM 14 is erased. Upon erasing the fingerprint data, the controller 12 controls the liquid crystal panel 28 to display a message "Please enter your department code" as shown in FIG. 3A. When another user B operates, its department code is accepted through the operating unit 20 and authenticated in the same manner as described above (S10 and S12).

Figure 3B:
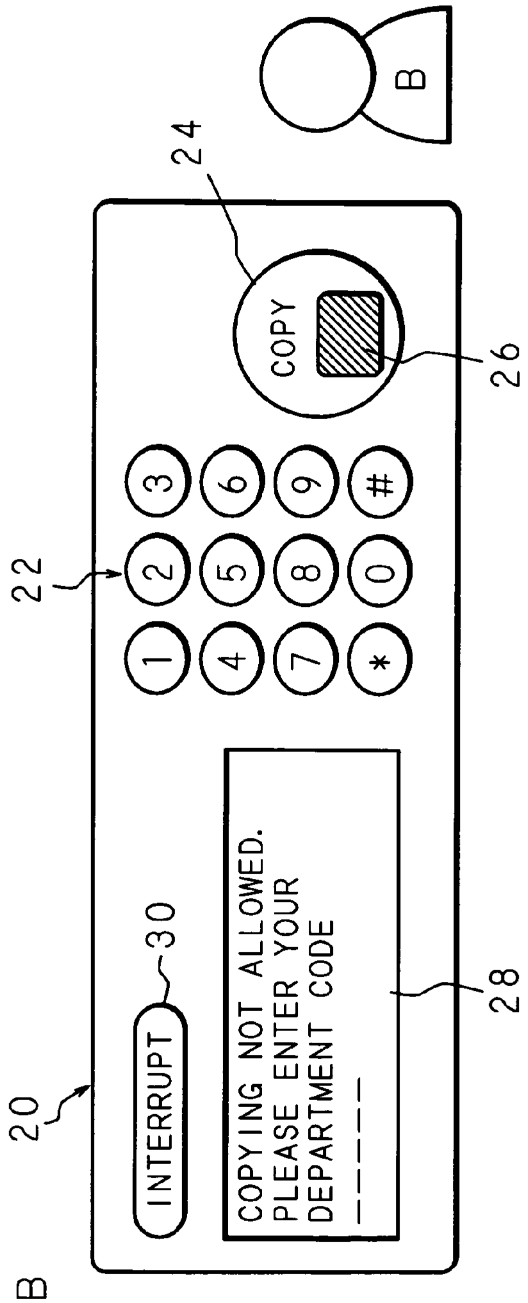

When the copy key 24 is pressed again within the predetermined time ("no" at S26 or "yes" at S28), its start signal is transferred together with the fingerprint data read by the fingerprint reader 26 (S30) to the controller 12. The controller 12 then collates the read fingerprint data with the fingerprint data stored in the first storage area of the RAM 14. When the collation result is "disconformity" ("no" at S32), the controller 12 erases the fingerprint data stored in the first storage area of the RAM 14 (S34). For example, when the user is shifted from A to B, its fingerprint data changes and the collation result is "disconformity". This causes the controller 12 to erase the fingerprint data stored in the first storage area of the RAM 14. Accordingly as shown in FIG. 3B, the controller 12 controls the liquid crystal panel 28 to display a message "Copying not allowed. Please enter your department code" indicating no permission of the copying process and a demand for entering the department code. The authentication then follows in the same manner as described above when the department code has been entered by the user B operating the operating unit 20 (S10 and S12).

When the collation result is "conformity" ("yes" at S32), the controller 12 controls the image processing unit 18 to start the copying process as the copy key 24 has been pressed down (S18). For example, when the user is not different and its fingerprint is identical, the collation result is "conformity". Then the controller 12 controls image processing unit 18 to start the copying process. The succeeding steps are the same as described above (S20 to S34).

Figure 4A:
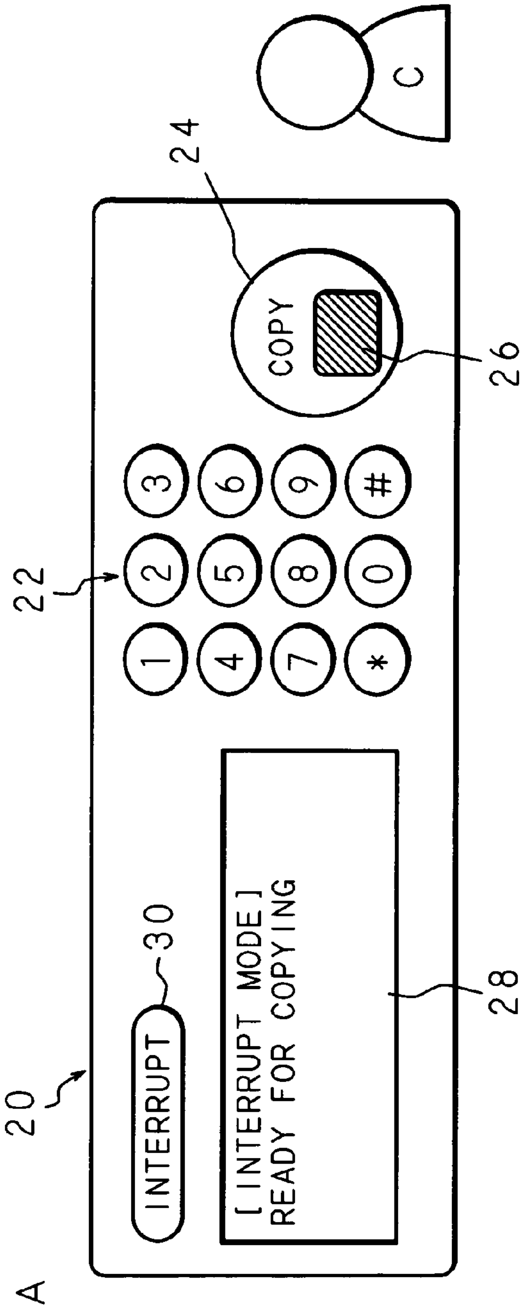
FIGS. 4A and 4B are diagrams showing examples of the operating unit.
Figure 7:
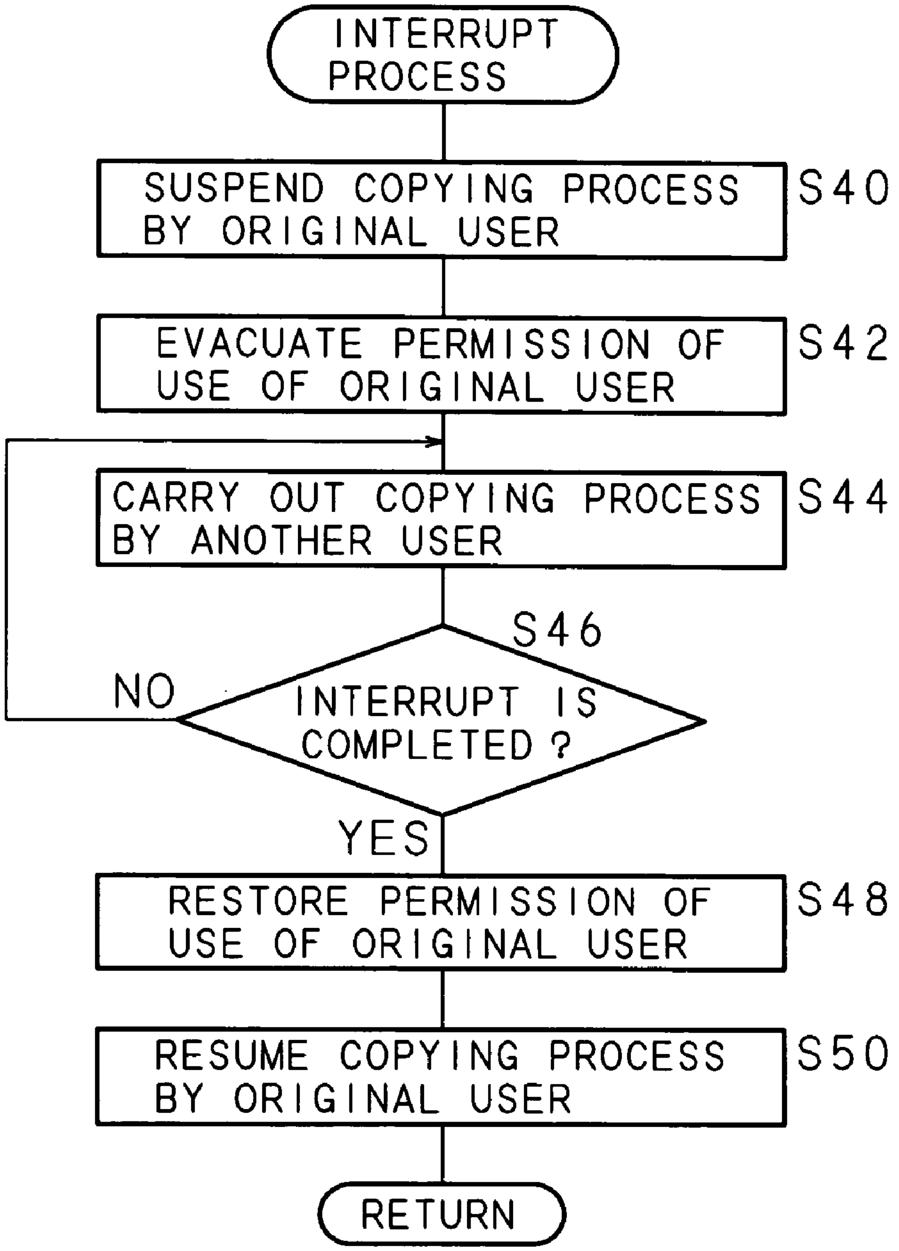
FIG. 7 is a flowchart showing procedures of a temporal interrupt copying process by another user.

FIG. 7 is a flowchart showing a procedure of the interrupt process for conducting a temporal copying process by another user (see S22 in FIG. 6). When the interrupt key 30 is pressed by another user C, the controller 12 accepts the interrupt instruction, suspends the copying process by the user A (S40) and temporarily moves the department code and the fingerprint data that are the information on the permission of use of the original user A from the first storage area to the second storage area of the RAM 14 for evacuation (S42). Then, the steps of authentication, storing, and collation by the department code of the user C are carried out in the same manner as described above before the copying process by the user C is conducted (S44). When the authentication of the user C is admitted, the controller 12 controls the liquid crystal panel 28 to display messages of "Interrupt mode" and "Ready for Copying" as shown in FIG. 4A.

Figure 4B:
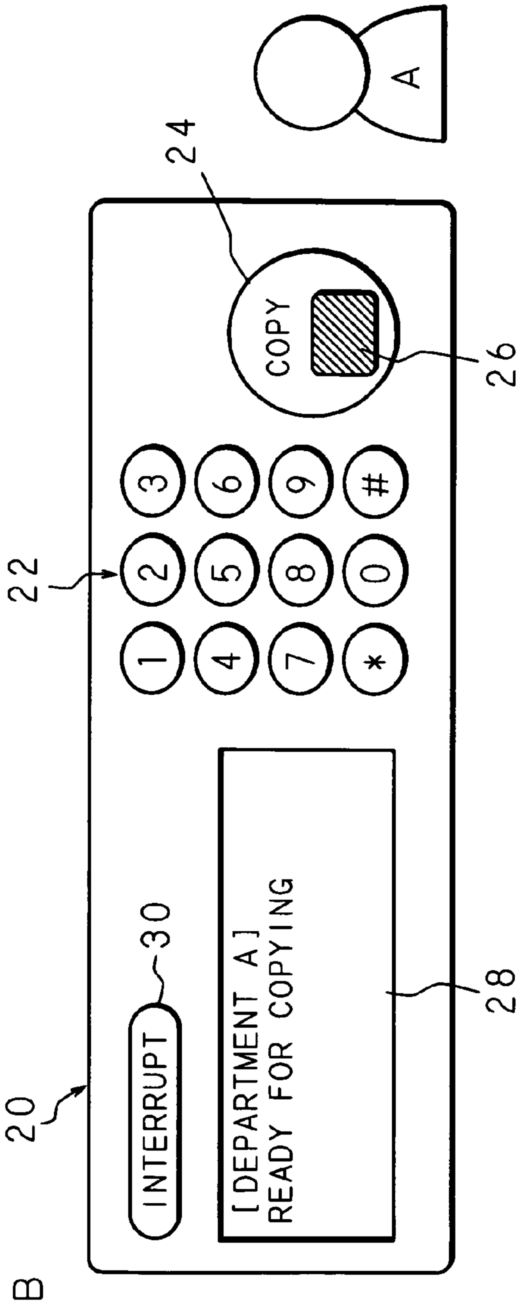

When the interrupt process by the user C is completed ("yes" at S46), the controller 12 restores the information on the permission of use (the department code and the fingerprint data) of to the user A from the second storage area to the first storage area of the RAM 14 (S48). The interrupt process may automatically be ended upon detection of the interrupt key 30 pressed again or the copying process of one job cycle completed by the user C. The restoring of the information on the permission of use includes restoring the fingerprint data from the second storage area to the first storage area and updating the identification code to the identification code assigned to the user A. When the information on the permission of use of the user A have been restored, the controller 12 controls the liquid crystal panel 28 to display a message "Ready for Copying" together with the authenticated "department A" as shown in FIG. 4B. After that, the copying process by the original user A resumes (S50).

The image processing apparatus 10 may be equipped with a communication interface (receiving means) 19, such as a local area network (LAN) card or a Centronics interface, which is connected with a computer for printing image data received from the computer. For example, for a "confidential" print, its print data accompanied with the identification code is transferred from the computer by the user C to the image processing apparatus 10 where it can be printed down upon the user C entering the identification code from the operating unit 20. When the image processing apparatus 10 receives the "confidential" print data transferred from the computer during its copying process by the user A, its controller 12 controls the liquid crystal panel 28 to display the reception of the "confidential" print data, allowing the user C to request an interrupt process from the operating unit 20 for printing down the "confidential" data.

Figure 8:
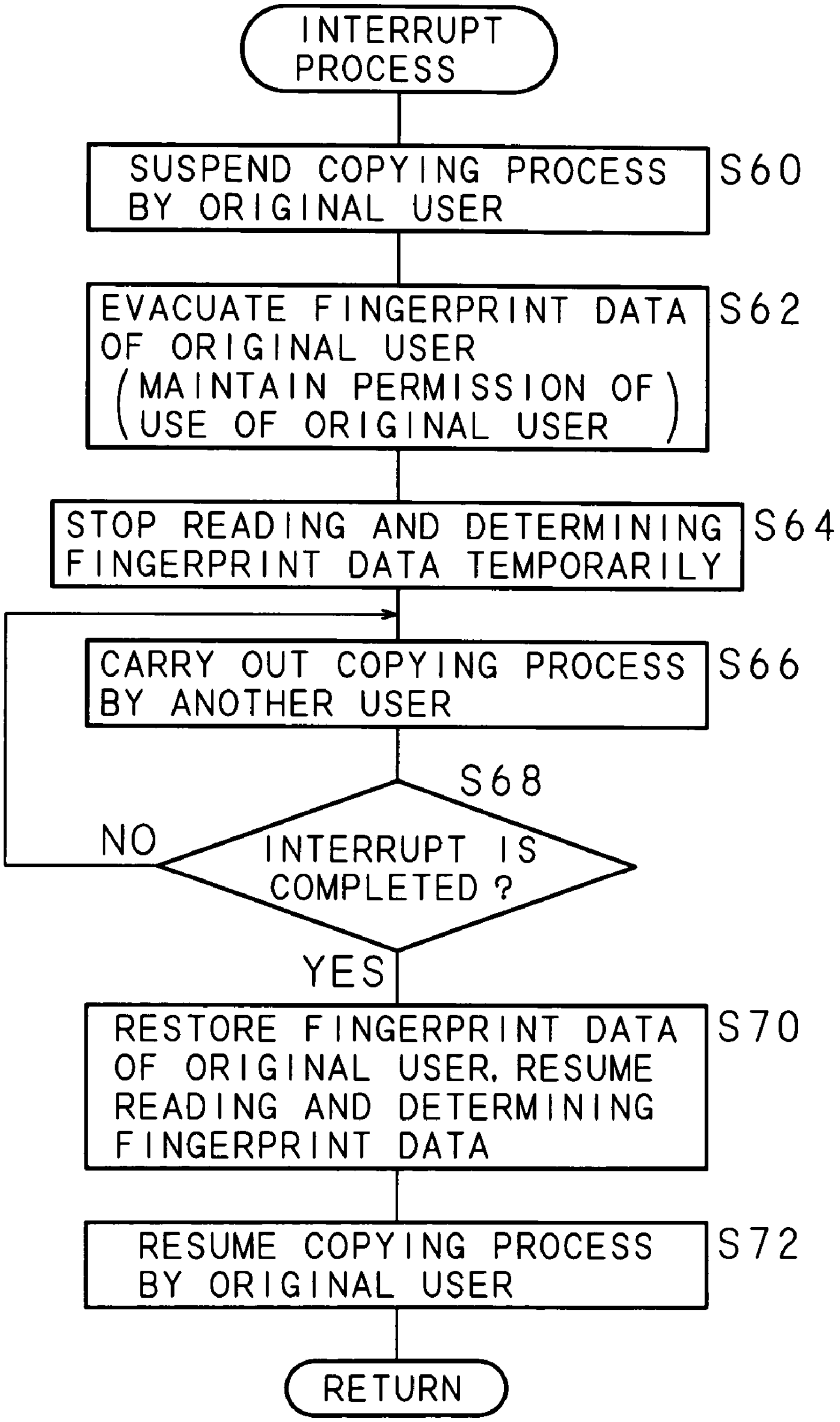
FIG. 8 is a flowchart showing procedures when a skilled user assisting an unskilled user.

FIG. 8 is a flowchart showing the copying process demanded by the user A who is unfamiliar to the operation and thus operation-assisted by the user C as an interrupt process (S22) of FIG. 6. For the purpose, the operating unit 20 may comprise an operation assist key (operation assist accepting means) on behalf of the interrupt key 30 or an operation assist key in addition to the interrupt key 30. The process starts with the controller 12 suspending the copying process by the original user A when the operation assist key has been pressed by the user A who is unfamiliar to the copying process for demanding a help from the user C (S60). While the authenticated department code (the permission of use) of the original user A remains unchanged, the fingerprint data of the user A is temporarily evacuated to the second storage area of the RAM 14 (S62). Then, the controller 12 temporarily stops the process of reading and determining the fingerprint data (S64). While the department code of the user A remains authenticated by the controller 12, the copying process is conducted by the user C (S66). When the operation assist (interrupt) process is completed or the operation assist key is pressed again ("yes" at S68), the controller 12 restores the fingerprint data of the original user A back to the first storage area of the RAM 14 and restarts the process of reading and determining the fingerprint data (S70). Then, the collation of the fingerprint data of the original user A with the stored data is revived allowing the copying process by the user A to restart (S72). It may be possible that the operation assist process includes storing the fingerprint data of the user C and allowing the collation of the fingerprint data with an input of the fingerprint data.

Accordingly, when the image processing apparatus 10 conducting the copying process by the original user (user A) is temporarily used by another user (user C) for, e.g., the interrupt process, the copying process of interrupt prints from data received from the computer, or the operation assist process to assist the original user, its authenticated data including the biometrics information and the identification code of the original user are evacuated, thus contributing to the improvement of use of the image processing apparatus 10 with no need of re-entering the biometrics information and the department code by the original user.

The present invention is not limited to the image processing apparatus of the described embodiment where a user is authenticated from its identification code such as a department code but may be applied to any image processing apparatus where a user is authenticated from both the identification code and the fingerprint or only from its fingerprint. The identification code is not limited to the entry from the ten keys 22 but may be read from an IC card by the use of an IC card reader installed in the operating unit 20.

Although the present invention is described with the method for conducting primarily the copying process, it may be applied to a method for conducting facsimile transmission etc. Also, the present invention is not limited to the image processing apparatus but may be applied to any processing apparatus. Moreover, the biometrics information is not limited to the fingerprint but may be selected from any other information on a living body.

When the data enables to be switched between the write inhibited mode and the write allowed mode, its fingerprint data (biometrics information) may be not evacuated to and restored from the second storage area of the RAM 14 but remain in the first storage area for switching between the write inhibited mode and the write allowed mode.

As the present invention may be embodied in several forms without departing from the spirit of essential characteristics thereof, the foregoing embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A use management method for a processing apparatus, said processing apparatus arranged for authenticating through collating an input of identification code with an identification code stored in advance, reading biometrics information from an entry process made when the authentication has been admitted and storing the biometrics information in a first storage area of a storage unit, collating biometrics information read from the succeeding entry process with the biometrics information stored in the first storage area, conducting a process based on the entry process with the authenticated identification code when the collation result is conformity, and erasing the biometrics information stored in the first storage area of the storage unit when the collation result is disconformity, the method comprising the steps of:

evacuating the biometrics information stored in the first storage area before erased to the second storage area of the storage unit when an entry process is made with biometrics information which is different from the biometrics information stored in the first storage area of the storage unit; and restoring the biometrics information in the second storage area to the first storage area of the storage unit when an entry process is made with the biometrics information having been evacuated.

2. A processing apparatus comprising:

a controller capable of performing operations of:

authenticating through collating an input of identification code with an identification code stored in advance;

reading biometrics information from an entry process made when the authentication has been admitted and storing the biometrics information in a first storage area of a storage unit;

collating biometrics information read from the succeeding entry process with the biometrics information stored in the first storage area;

conducting a process based on the entry process with the authenticated identification code when the collation result is conformity;

erasing the biometrics information stored in the first storage area of the storage unit when the collation result is disconformity;

evacuating the biometrics information stored in the first storage area before erased to the second storage area of the storage unit when entry process is made with biometrics information which is different from the biometrics information stored in the first storage area of the storage unit; and restoring the biometrics information in the second storage area to the first storage area of the storage unit when an entry process is made with the biometrics information having been evacuated.

3. The processing apparatus according to claim 2, further comprising:

an interrupt accepting unit for accepting an interrupt instruction for instructing a process based on an entry process with biometrics information, which is different from the biometrics information stored in the first storage area of the storage unit, and an identification code newly authenticated, wherein the controller is further capable of performing an operation of evacuating the biometrics information stored in the first storage area of the storage unit before erased to the second storage area of the storage unit while storing the authenticated identification code in the storage unit when the interrupt instruction is accepted by the interrupt accepting unit.

4. The processing apparatus according to claim 2, further comprising:

an operation assist accepting unit for accepting an operation assist instruction for instructing a process based on an entry process with biometrics information, which is different from the biometrics information stored in the first storage area of the storage unit, and the authenticated identification code, wherein the controller is further capable of performing an operation of evacuating the biometrics information stored in the first storage area of the storage unit before erased to the second storage area of the storage unit when the operation assist instruction is accepted by the operation assist accepting unit.

5. The processing apparatus according to claim 2, further comprising:

an end accepting unit for accepting the end of an entry process with biometrics information which is different from the biometrics information evacuated to the second storage area of the storage unit, wherein the controller is further capable of performing an operation of restoring the biometrics information in the second storage area to the first storage area of the storage unit when the end of the entry process is accepted by the end accepting unit.

6. The processing apparatus according to claim 2, wherein the controller is further capable of performing an operation of restoring the biometrics information in the second storage area of the storage unit to the first storage area of the storage unit when the process according to the entry process with biometrics information which is different from the biometrics information evacuated to the second storage area of the storage unit has been ended.

7. The processing apparatus according to claim 2, further comprising:

a receiving unit for receiving data, wherein the data received by the receiving unit is processed.

8. The processing apparatus according to claim 2, further comprising:

an image forming unit for forming an image on a sheet of material, wherein the process of forming an image is conducted.

9. A processing apparatus comprising:

means for authenticating through collating an input of identification code with an identification code stored in advance;

means for reading biometrics information from an entry process made when the authentication has been admitted and storing the biometrics information in a first storage area of a storage unit;

means for collating biometrics information read from the succeeding entry process with the biometrics information stored in the first storage area;

means for conducting a process based on the entry process with the authenticated identification code when the collation result is conformity;

means for erasing the biometrics information stored in the first storage area of the storage unit when the collation result is disconformity;

evacuating means for evacuating the biometrics information stored in the first storage area before erased to the second storage area of the storage unit when an entry process is made with biometrics information which is different from the biometrics information stored in the first storage area of the storage unit; and restoring means for restoring the biometrics information in the second storage area to the first storage area of the storage unit when an entry process is made with the biometrics information having been evacuated by the evacuating means.

10. The processing apparatus according to claim 9, further comprising:

interrupt accepting means for accepting an interrupt instruction for instructing a process based on an entry process with biometrics information, which is different from the biometrics information stored in the first storage area of the storage unit, and an identification code newly authenticated, wherein the evacuating means evacuates the biometrics information stored in the first storage area of the storage unit before erased to the second storage area of the storage unit and stores the authenticated identification code in the storage unit when the interrupt instruction is accepted by the interrupt accepting means.

11. The processing apparatus according to claim 9, further comprising:

operation assist accepting means for accepting an operation assist instruction for instructing a process based on an entry process with biometrics information, which is different from the biometrics information stored in the first storage area of the storage unit, and the authenticated identification code, wherein the evacuating means evacuates the biometrics information stored in the first storage area of the storage unit before erased to the second storage area of the storage unit when the operation assist instruction is accepted by the operation assist accepting means.

12. The processing apparatus according to claim 9, further comprising:

end accepting means for accepting the end of an entry process with biometrics information which is different from the biometrics information evacuated to the second storage area of the storage unit, wherein the restoring means restores the biometrics information in the second storage area to the first storage area of the storage unit when the end of the entry process is accepted by the end accepting means.

13. The processing apparatus according to claim 9, wherein the restoring means restores the biometrics information in the second storage area of the storage unit to the first storage area of the storage unit when the process according to the entry process with biometrics information which is different from the biometrics information evacuated to the second storage area of the storage unit has been ended.

14. The processing apparatus according to claim 9, further comprising:

receiving means for receiving data, wherein the data received by the receiving means is processed.

15. The processing apparatus according to claim 9, further comprising:

image forming means for forming an image on a sheet of material, wherein the process of forming an image is conducted.

* * * * *